United States Patent [19]

Virant

[11] Patent Number: 4,659,943
[45] Date of Patent: Apr. 21, 1987

[54] PEAK DEMAND LIMITER

[76] Inventor: Robert L. Virant, 14794 Leffingwell Rd., Box 88, Berlin Center, Ohio 44401

[21] Appl. No.: 841,304

[22] Filed: Mar. 19, 1986

[51] Int. Cl.[4] ............................................. H02J 3/00
[52] U.S. Cl. ..................................... 307/39; 307/35; 307/38
[58] Field of Search ...................... 307/34, 35, 38, 39; 323/249, 250, 328, 329; 336/175

[56] References Cited

U.S. PATENT DOCUMENTS

| | | | |
|---|---|---|---|
| 2,686,898 | 8/1954 | Schweitzer, Jr. | 336/175 |
| 3,408,503 | 10/1968 | Wyman et al. | 307/38 |
| 4,028,620 | 6/1977 | Kitagawa et al. | 324/51 |
| 4,216,384 | 8/1980 | Hurley | 307/35 |
| 4,419,589 | 12/1983 | Ross | 307/39 |

Primary Examiner—William M. Shoop, Jr.
Assistant Examiner—Richard K. Blum
Attorney, Agent, or Firm—Harpman & Harpman

[57] ABSTRACT

A peak demand limiter to monitor a plurality of electrical circuits and to selectively switch the circuit in a predetermined pattern based on priority selection comprises a load detection circuit coupled to a logic processor that generates and sends output data to control switches on preselected non-priority circuits.

1 Claim, 3 Drawing Figures

PEAK DEMAND LIMITER

BACKGROUND OF THE INVENTION

1. Field of the Invention:

This device relates to load detection and switching devices used to reduce peak demand generated by simultaneous use of high energy demand devices thus decreasing overall electricity demand at a given time.

2. Description of the Prior Art:

Prior art devices of this type have utilized a variety of different ways to monitor and control demand load circuits. See for example U.S. Pat. Nos. 3,408,503, 4,419,589, 4,028,620.

In U.S. Pat. No. 3,408,503, a monitoring device is disclosed that utilizes a sensing coil and comparator unit with a number of individual relays that control the loads.

U.S. Pat. No. 4,028,620 discloses an elaborate control system that determines the closed contact from a plurality of contacts representing a number of loads and generates an output signal through an output unit.

Finally in U.S. Pat. No. 4,419,589 a multi-stage electrical control system is shown that manages a plurality of loads using powered current transformers for sensing monitored line status.

Applicant's device utilizes remote non-powered load sensing coils that react in response to present load demands and generate output by induction to a logic circuit which correspondly controls solid state triacs on preselected non-priority load circuits.

SUMMARY OF THE INVENTION

A peak demand limiter that monitors and detects load changes in selective circuits by generating a controlled output signal from load detectors to a logic processor that selectively activiates control switches on a preselected and monitored load generating circuit. The peak demand limiter visually indicates the load condition of the monitored circuits thereby determining which of the monitored circuits is currently under load.

DESCRIPTION OF THE PREFERRED EMBODIMENT

A peak demand limiter used to detect and limit by selective activation the peak load or demand at the point of use in a residential environment.

Figure 1:
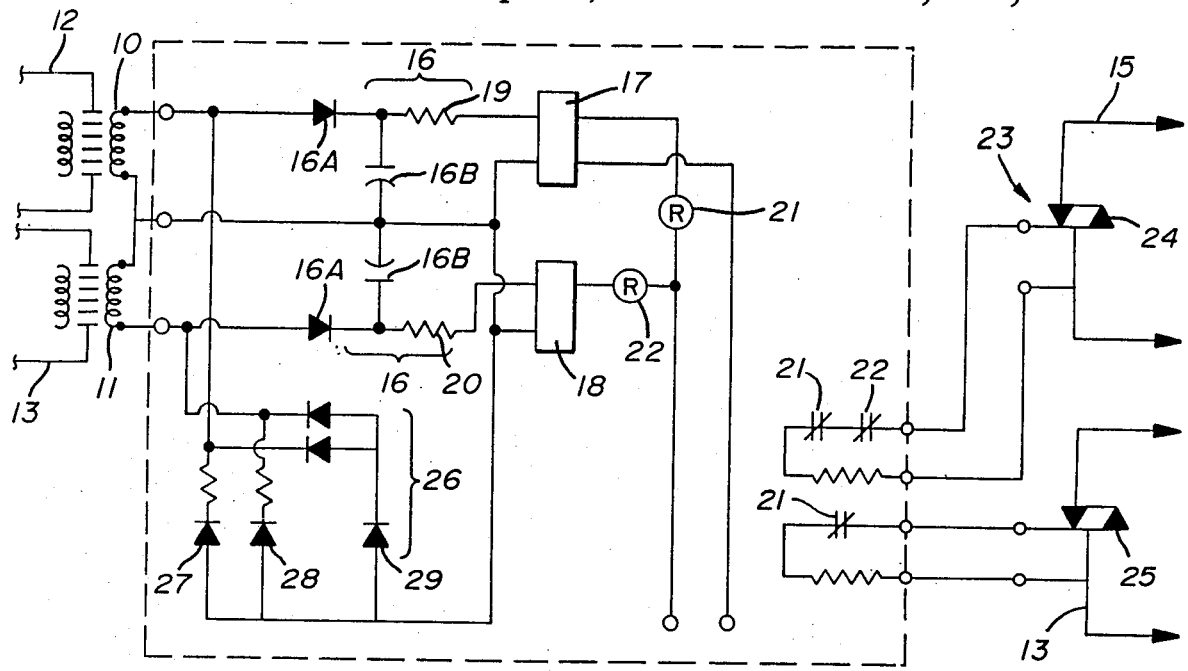
FIG. 1 is a circuit diagram of the peak demand limiter.

Referring to FIG. 1 of the drawings, a circuit diagram can be seen wherein a pair of non-powered saturable core transformers 10 and 11 are positioned around a pair of load circuits 12 and 13 which are to be monitored. The saturable core transformers 10 and 11 can be varied as to the load monitored response by increasing or decreasing the ampere turns 14 seen in FIG. 3 of the drawings. The circuit example chosen for illustration continuously monitors the two load circuits 12 and 13 and switchably controls one of the monitored circuits 13 and a third non-monitored load circuit 15 with the priority circuti being load circuit 12.

During a load situation if either of the monitored load circuits 12 and 13 are activated above a predetermined level of the saturable core transformers 10 and 11, a signal will be generated by either of the saturable core transformers 10 or 11 which would consist of a positive half wave applied to half wave rectifier circuit 16 comprised of a rectifier 16A and a condensor 16B. The resultant DC signal is then presented to logic processors 17 and 18 through current limit resistors 19 and 20 respectively. The logic processors 17 and 18 in this example are commercially available as MDC 3010 ICI having an internal triac which is switched "on" when a signal is presented to it that is greater than 5ma ie (2 amps in the monitored load circuit).

The logic processors 17 and 18 (MDC 3010 ICI) in turn activate gate signal relays 21 and 22 within a primarly load control circuit 23. The PLC circuit 23 contains the non-monitored load circuit 15 and the monitored load circuit 13 which are controlled by load triacs 24 and 25 respectively. The load triac 24 is activated by a signal input from the gate signal relays 21 and 22 with the load triac 25 activated by a signal from the gate signal relay 21 only. The abovedescribed circuit establishes a peak demand limiter for use on three load circuits 12, 13 and 15 with the variable control demand option sequences described below.

When the load circuit 12 is activated, both load control circuits 13 and 15 are interrupted by their respective triacs in response to signal relay 21. Upon termination of demand of the load circuit 12, the triacs 24 and 25 will close allowing load control circuits 13 and 15 to be used. When the load control circuit 13 is used (it is alo a monitored circuit) the logic processor 18 is actuated and the gate signal relay 22 activates the triac 24 disabling the load control circuit 15, a non-monitored circuit.

This arrangement allows for the operation of any one circuit 12, 13 or 15 at any time only with demand priority operation of the load circuit 12 which can be used at any given time regardless of the operational condition of other circuits.

Figure 2:
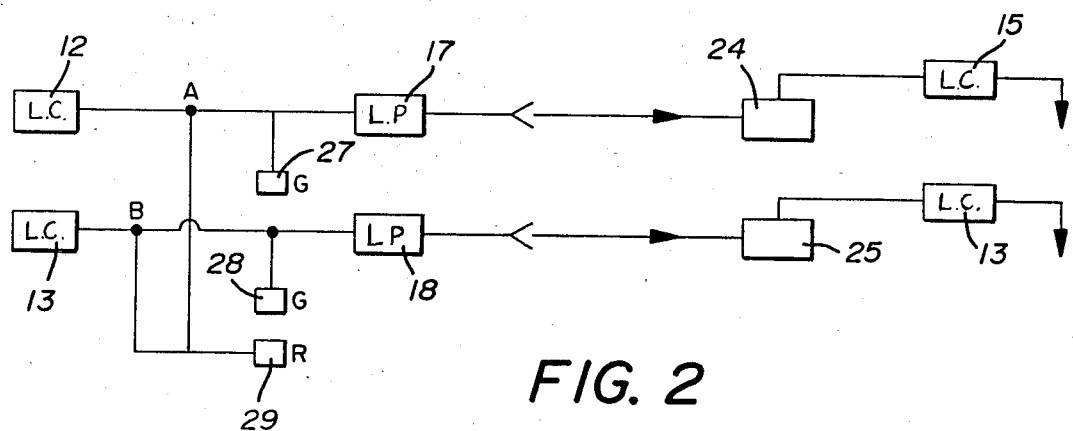
FIG. 2 is an operation flow diagram of the peak demand limiter.

In this example, such priority would be given to an electric range representing the circuit while the circuit 13 could be a clothes dryer and the circuit 15 a hot water heater. Referring now to FIGS. 1 and 2 of the drawings, a signal circuit 26 with light emitting diodes 27, 28 and 29 can be seen that provides a visual display of monitored circuits status in the following manner. When the load circuit 12 is activated, the diode 27 is on and correspondingly when the load circuit 13 is activated the diode 28 is on green (G). When either of the monitored circuits is on, the diode 29 is activated indicating the circuit 15 is off, red (R), at that time.

Figure 3:
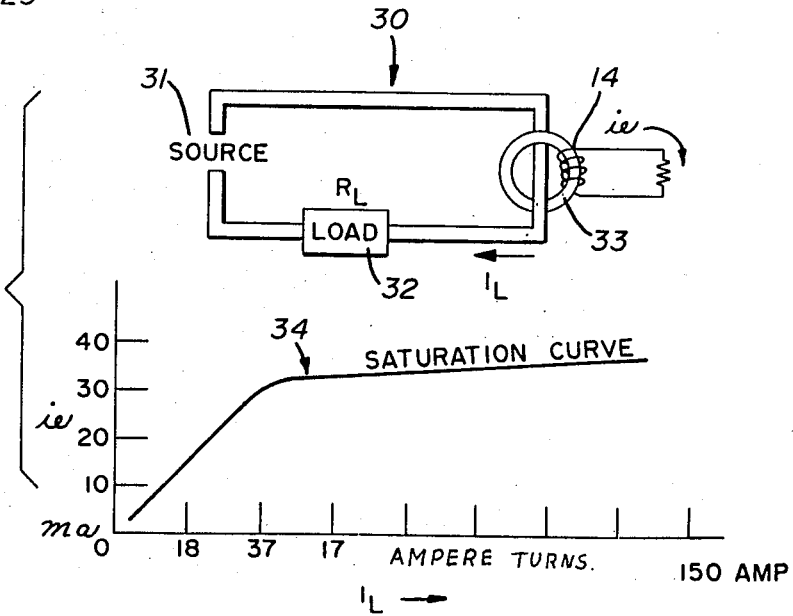
FIG. 3 is a flow diagram and performance chart of the characteristics of a portion of the peak demand limiter.

Referring now to FIG. 3 of the drawings, a diagram and a graph of the output of a saturated core transformer can be seen which depicts the characteristic output of the transformer on the vertical line under a given load condition variable in relation to amper turns on the horizontal line of the graph. A diagram 30 shows a typical source 31 with a load 32 in condition with a saturated core transformer 33 having 100 turns #18 wire spaced wound.

Referring now to a graph 34 which discloses the saturated transformer curve on the given condition shown and the response of the transformer in relation to input from the load source. The output of the saturated core transformer is relatively constant after reaching the predetermined saturation point which is clearly shown in the graph 34.

The load detection ability of the peak demand limiter is instantaneous in that the sensors are not in the monitored circuit and the solid state triacs are used to interrupt the control circuits providing for an efficient and effective limiter that uses no power when non-activated and only 1 watt (in given example) per load interrupt when activated. The negative half of the saturated core transformer output is used to drive the circuit indicators represented by the LED's as hereinbefore described.

It will thus be seen that a new and effective peak limit demand limiter has been illustrated and described and it will be apparent to those skilled in the art that various changes and modifications may be made therein without departing from the spirit of the invention and having thus described my invention what I claim is:

1. A peak demand limiter circuit for controlling the overall load demand for electrical power in several load circuits by monitoring the same and their connection with a source of electrical power, the peak demand limiter circuit characterized by its monitoring mode that requires no power consumption in said mode, said peak demand limiter circuit comprising a saturable core transformer positioned around said load circuits and a rectifier circuit to modify a signal generated by said saturable core transformer upon any of said monitored load circuits reaching a pre-determined load level, a logic processor in connection with said rectifier circuit and driven by output power from said saturable core transformer via said rectifier circuit, a plurality of gate signal relays responsive to said logic processor, a primary load control circuit and a load triac in connection with said load circuits for interupting said series of said load circuits responsive in operation to said signal generated by said saturable core transformer, means for varying the pre-determined load level by increasing or decreasing amper turns on said saturable core transformers so that said saturable core transformer response can be varied.

* * * * *